United States Patent [19]
Helfritch et al.

[11] Patent Number: 5,695,616
[45] Date of Patent: Dec. 9, 1997

[54] ELECTRON BEAM FLUE GAS SCRUBBING TREATMENT

[75] Inventors: Dennis Helfritch, Baltimore, Md.; Ralph D. Genuario, Alexandria, Va.

[73] Assignees: Virginia Accelerators Corporation, Alexandria, Va.; Research-Cotrella Companies, Inc., Branchburg, N.J.

[21] Appl. No.: 534,632

[22] Filed: Sep. 27, 1995

[51] Int. Cl.$^6$ .......................... B01D 53/00; C01B 21/00; B01J 19/08; A61N 5/00

[52] U.S. Cl. ................... 204/157.3; 204/157.43; 204/157.46; 204/157.49; 422/186.04; 250/492.3; 588/243; 588/247; 588/900

[58] Field of Search ............... 204/157.3, 157.43, 204/157.46, 157.49; 422/186.04; 250/492.3; 588/243, 347, 900

[56] References Cited

U.S. PATENT DOCUMENTS

| | | | |
|---|---|---|---|
| 4,372,832 | 2/1983 | Bush | 204/157.46 |
| 5,041,271 | 8/1991 | Aoki et al. | 205/157.46 |
| 5,397,444 | 3/1995 | Zimek et al. | 204/157.3 |
| 5,457,269 | 10/1995 | Schonberg | 588/212 |

FOREIGN PATENT DOCUMENTS

408772   6/1994   European Pat. Off. .

Primary Examiner—Kathryn L. Gorgos
Assistant Examiner—Edna Wong
Attorney, Agent, or Firm—Trapani & Molldrem

[57] ABSTRACT

A flue-gas scrubbing arrangement removes sulfur oxides and nitrogen oxides from stack gases at low energy costs and converts these into non-noxious ammonium sulfate-nitrate, which is utilizable as an agricultural fertilizer. The flue gases, cleaned of fly ash, pass through a spray dryer, where water is spray-injected to cool and humidify the gas. Then the humidified gas passes through an e-beam reactor where high energy electrons bombard water and oxygen to create strong reagents that react with the $SO_2$ and $NO_x$ to form sulfuric and nitric acids. These react with ammonia gas that is injected into the flue gas stream to form sulfate and nitrate salts of ammonia. The ammonia should be present in near stoichiometric amounts relative to the sulfur and nitrogen oxides. The flue gas with the moisture and entrained salts pass to a wet precipitator, where the salts are removed in aqueous solution, and the remaining, scrubbed flue gases pass to the stack. The aqueous solution is then fed back to the spray dryer, where the incoming flue gases pick up the water and precipitate the ammonium sulfate-nitrate as particles of about 100 μm. Cooling water from the electron beam generation equipment can be used as make-up water for the spray dryer.

13 Claims, 2 Drawing Sheets

ELECTRON BEAM FLUE GAS SCRUBBING TREATMENT

BACKGROUND OF THE INVENTION

This invention relates to scrubbing of flue gases to remove sulfur oxides and nitrogen oxides, and is particularly concerned with a scrubbing technique that operates at low energy costs and which recovers the sulfur and nitrogen as safe, non-noxious and utilizable by-products.

Because of environmental problems presented by oxides of nitrogen and sulfur, flue emissions from fossil fuel burning facilities and from municipal solid waste (MSW) burning incinerators require treatment to remove $SO_2$ and $NO_x$ gases from the flue gases. These gases tend to be quite reactive, and precipitate out of the air dissolved in condensed atmospheric moisture, in the phenomenon known as "acid rain." When this happens, soil acidity is increased, which can lead to erosion and damage to natural plant life.

Because of the requirement to deal with sulfur and nitrogen oxides in stack gases, the utilization of high-sulfur and low-energy fossil fuels has been rather limited. Many available fuel sources, such as oil shale, have a low energy content (e.g., twelve megajoules per kilogram), so the cost of scrubbing the stack gasses has become prohibitive compared with the amount energy that can be generated from that fuel source. For the same reasons, it has been difficult to operate MSW-fueled boilers at a profit.

A scrubbing process known as Electron-Beam Flue Gas Treatment (EBFGT) has been proposed as a single-step method for simultaneous removal of $SO_2$ and $NO_x$ from flue emissions. In this process, the boiler flue gas is cleaned of fly ash by a particle collector, such as a precipitator or a baghouse. The gas passes through a spray dryer, where water is spray-injected or atomized, and the gas is cooled and humidified. Then the humidified gas passes through an e-beam reactor, where an electron beam generator, or accelerator, bombards the water and oxygen molecules in the gas stream with highly energetic electrons. These break down the $O_2$ molecules and dissociate the water molecules into $OH^-$ and $H^+$ portions. These react with the sulfur oxide and nitrogen oxide to form sulfuric acid and nitric acid. This is done in the presence of a reagent, such as ammonia, with the result that sulfate and nitrate salts of ammonia are immediately formed. In theory, at least, ammonium nitrate and ammonium sulfate can be removed downstream, leaving the stack gases free of $SO_2$ and $NO_x$.

Unfortunately, the ammonium nitrate and sulfate salts, being highly water soluble, are difficult to precipitate out of the humidified gas stream. It has been proposed to employ a fabric filter to capture the salts. However, the high solubility of the salts, coupled with the nearly water-saturated gas following the e-beam reactor, results in severe plugging and clogging problems in the fabric filter. Also, as the flue gas proceeds, the ammonium nitrate-sulfate salt precipitates onto the walls of the flue gas pipe as a sticky coating, and the system must be shut down periodically to remove this coating. Also, the particles of salt collected in this manner are extremely fine, on the order of one micron in size, and this makes the salt by-product hazardous and difficult to handle.

In order to produce power economically, the energy consumed in scrubbing the stack gases should not exceed a small fraction of the energy output of the plant. For an electron beam dry scrubbing (EBDS) process to be acceptable to the U.S. utility industry, the process must consume no more than three percent of plant net power. However, previous proposals for electron beam scrubbing have always exceeded this amount. For example, the process equipment needed for compaction and granulation of the one-micron by-product consumes too much power, and additional power is consumed in the atomization of make-up water.

OBJECTS AND SUMMARY OF THE INVENTION

Accordingly, it is an object of the invention to provide a scrubbing process which will economically remove oxides of nitrogen and sulfur from combustion flue gases.

It is another object to provide a flue gas scrubbing process which produces a useable, safely handled by-product from the removed nitrogen and sulfur.

It is a further object to provide an efficient scrubbing process that can be used with low energy content fuels, or with high sulfur content fuels.

According to an aspect of this invention, a closed-loop electron-beam flue gas treatment (EBFGT) process is integrated into the flue gas stream of a fossil-fuel generating plant, a municipal solid waste (MSW) fueled boiler, or other application where the flue gases must be scrubbed of $SO_2$ and $NO_x$ before being vented into the atmosphere. Initially, the plant or boiler flue gas is cleaned of fly ash (particulates) by a particle collector, such as a precipitator or baghouse. The flue gases then pass through a spray dryer, where the gas temperature is reduced and humidified. Here, the spray dryer uses an aqueous solution of ammonium nitrate-sulfate salts, rather than water only, and this solution is obtained from a subsequent stage, to be discussed shortly. The spray dryer precipitates the ammonium nitrate-sulfate salts as dry solid particles, and these are on the order of 100 microns in size. This large particle size facilitates collection, handling and storage, as compared with the one-micron size particles produced by previous methods. The flue gas leaving the spray dryer is then injected with ammonia in an mount that is near-stoichiometric in relation to the $SO_2$ and $NO_x$ components of the flue gas, and the flue gas then passes through an electron beam reactor. Here, a high-energy electron beam dissociates the water vapor and oxygen in the flue gas stream and creates powerful oxidants. These oxidants react with the $SO_2$ and $NO_x$ in the presence of water to form nitric and sulfuric acids. These acids then react with the ammonia for form ammonium sulfate-nitrate salts. The flue gases, with these entrained by-products, then is supplied to a wet precipitator, or equivalent apparatus, where the ammonium salts are recovered as an aqueous solution. From here, the scrubbed flue gases are exhausted to the stack, and the aqueous solution in the form of a purge stream from the wet precipitator, is fed back to the spray dryer for humidifying and cooling the flue gas stream entering the spray dryer. As mentioned above, the spray dryer dries the ammonium sulfate-nitrate salts, and these are then removed as a dry powder. The collected product is saleable as an agricultural fertilizer.

Because this system employs the spray dryer, rather than a filter, for collection of the ammonium sulfate-nitrate salts, most of the problems associated with the previously proposed techniques are avoided. The salts are collected as relatively, large particles, and this takes place ahead of the electron beam reactor, eliminating the severe plugging problems that occur where collection takes place downstream of the reactor. Any coating of the flue conduit in the reactor or downstream of it can be washed off with jets of water, and this can occur while the scrubbing system is on line.

To help stay within the scrubbing power limitation of 3% of plant net, as discussed previously, the invention employs hot water (e.g., 170° F) from the thermal management system for the electron gun or accelerator as the make-up water for the spray dryer. Each electron gun has to dissipate about 350 kW of waste heat. In the preferred mode, the electron accelerator employs transformer oil for the cooling medium. An oil-water heat exchanger extracts thermal energy from the transformer oil and delivers the make-up water at a temperature of about 160° F. This hot water from the thermal management system will raise the temperature of the water injected into the spray dryer to about 150° F. It has been found that injection of this heated make-up water will save about 100 kW of pump and nozzle power as compared with vaporizing room-temperature water.

The above and many other objects, features, and advantages of this invention will become apparent to persons skilled in the art from the ensuing description of a preferred embodiment, which should be considered in connection with the accompanying Drawing.

DETAILED DESCRIPTION OF A PREFERRED EMBODIMENT

Figure 1:
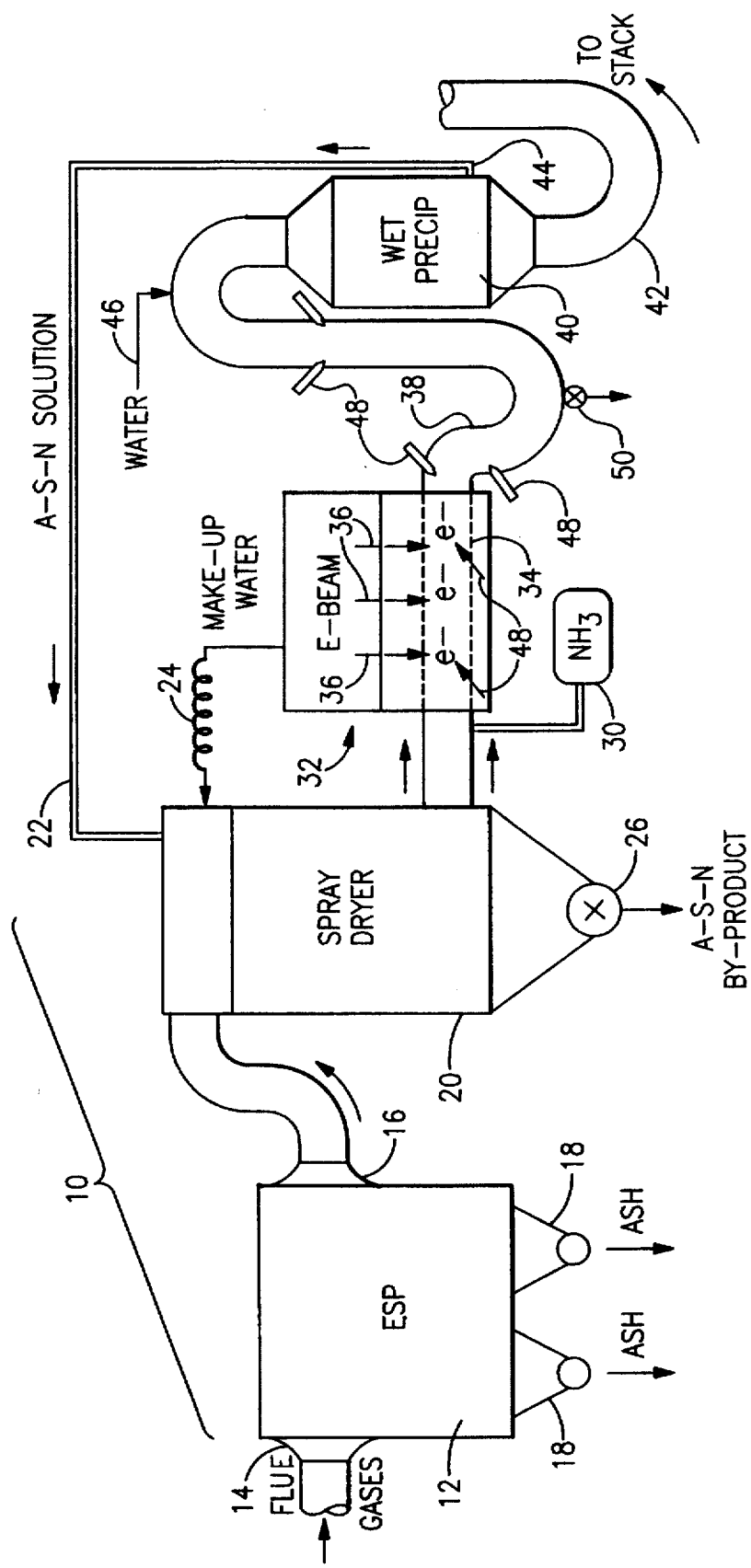
FIG. 1 is a schematic diagram of an electron beam flue gas scrubbing arrangement according to one embodiment of this invention.

With reference to the Drawing, and initially to FIG. 1 thereof, an electron beam flue gas scrubbing treatment (EBFGT) arrangement 10 is provided for scrubbing the combustion flue gases from a fossil fuel fired boiler or other source.

First, an electrostatic precipitator 12 removes the solid particulates. An inlet 14 receives the combustion products from the boiler (not shown), and after the particulates have been removed the gases leave an exhaust conduit 16. A particulates collector 18 (here a pair are shown) is provided at the bottom of the precipitator, and the solids can be withdrawn from the collectors on a continuous or periodic basis. In alternative arrangements, a baghouse collector can be employed, and the particulates can be separated from the flue gas stream by means of fabric filters.

The flue gas stream proceeds through the conduit 16 to a spray dryer 20, where the gas enters at about 170 degrees F. The flue gas is humidified and cooled by spraying or atomizing moisture into it. Here a feed line 22 supplies an aqueous solution of ammonium sulfate-nitrate salts from a downstream unit to the spray dryer 20, and a make-up water line 24 provides water to make up for stack losses. The spray dryer 20 dries the ammonium sulfate-nitrate salts which are collected in a particulate collector 26 at the bottom of the spray dryer 20. The particles are of moderate size, that is about 100 microns, and thus can be collected and transported safely without special protective equipment. The cooled and humidified flue gases exit the spray dryer via a conduit, and an ammonia injection line adds ammonia to the flue gases in an amount that is substantially stoichiometric with regard to the $SO_2$ and $NO_x$ components of the flue gases. The flue gases then pass through an electron beam reactor, where a gas conduit carries the flue gases past a bank of electron beam accelerators. In this stage, highly energetic electron beams bombard the gas molecules, with the effect of dissociating oxygen and water to create powerful reagents. These immediately react with the sulfur oxide and nitrogen oxide, forming nitric acid and sulfuric acid. Because this occurs in the presence of ammonia, ammonium sulfate and ammonium nitrate are formed. These salts are water soluble, and can be extracted later as an aqueous solution.

The flue gases proceed from the reactor 32 via a flue gas conduit or pipe 38 to a wet precipitator 40. There the sulfate and nitrate salts are separated as an aqueous solution, and the flue gases, scrubbed free of the $SO_2$ and $NO_x$ components, proceed via an exhaust conduit 42 to a stack, where the scrubbed combustion gases are vented. The ammonium sulfate-nitrate salts, dissolved in a water wash, leave the precipitator 40 via a wet purge outlet 44. It is this outlet 44 that supplies the aqueous salt solution through the feed line 22 back to the spray dryer 20. A water feed line 46 injects water into the wet precipitator 40, as needed.

Here, in the conduits 34 and 38, spray jets are arranged to rinse away any accumulation of ammonium nitrate or sulfate salt that might coat the conduits in the reactor 30 or downstream from it. As mentioned before, these salts are highly water soluble, and easily rinse away from the conduit walls. The dissolved material can be withdrawn from a drain 50, here shown in the conduit 38. The rinse from the drain 50 can be supplied to the spray dryer 20 as part of the aqueous salt solution.

As shown in FIG. 1, the make-up water line 24 emanates from the electron beam reactor 30. Here, the water employed for heat management of the electron accelerators 36 is used as make-up feed water for the spray dryer. Excess thermal energy from the electron beam accelerators is used to pre-heat the make-up water to about 160–170 degrees F. This reduces the energy requirement for spraying the water into the spray dryer, as compared with cool (room temperature make-up water), and also avoids having to vent the waste heat from the accelerators 36 directly to the environment. In one practical embodiment, the electron beam reactor 30 employs six (6) guns or accelerators, each capable of operating at 1.25 megawatts. These reactors have an efficiency of about 70 percent, so they produce about 300 kW of waste heat each, or a total of about 2 MW. In practice this produces about 30 gallons per minute of hot make-up water at 160 to 170 degrees F.

The electron beam guns or accelerators 36 are required to be of a design that is highly reliable, cost effective, and efficient. Moreover, the accelerator design must be able to produce an even elecron beam intensity over a fairly broad area, i.e., 625 kW for an area of 25 cm by 100 cm, scalable to 1.25 kW for an area of 50 cm by 100 cm. The gun employed in this embodiment is of a double-grid tetrode design, similar in many ways to an electron beam accelerator that is described in Farrell et al. U.S. Pat. No. 3,863,163. However, in this case, the accelerator 36 is operated at 1.25 MW in a pulsed mode as opposed to dc operation.

Figure 2:
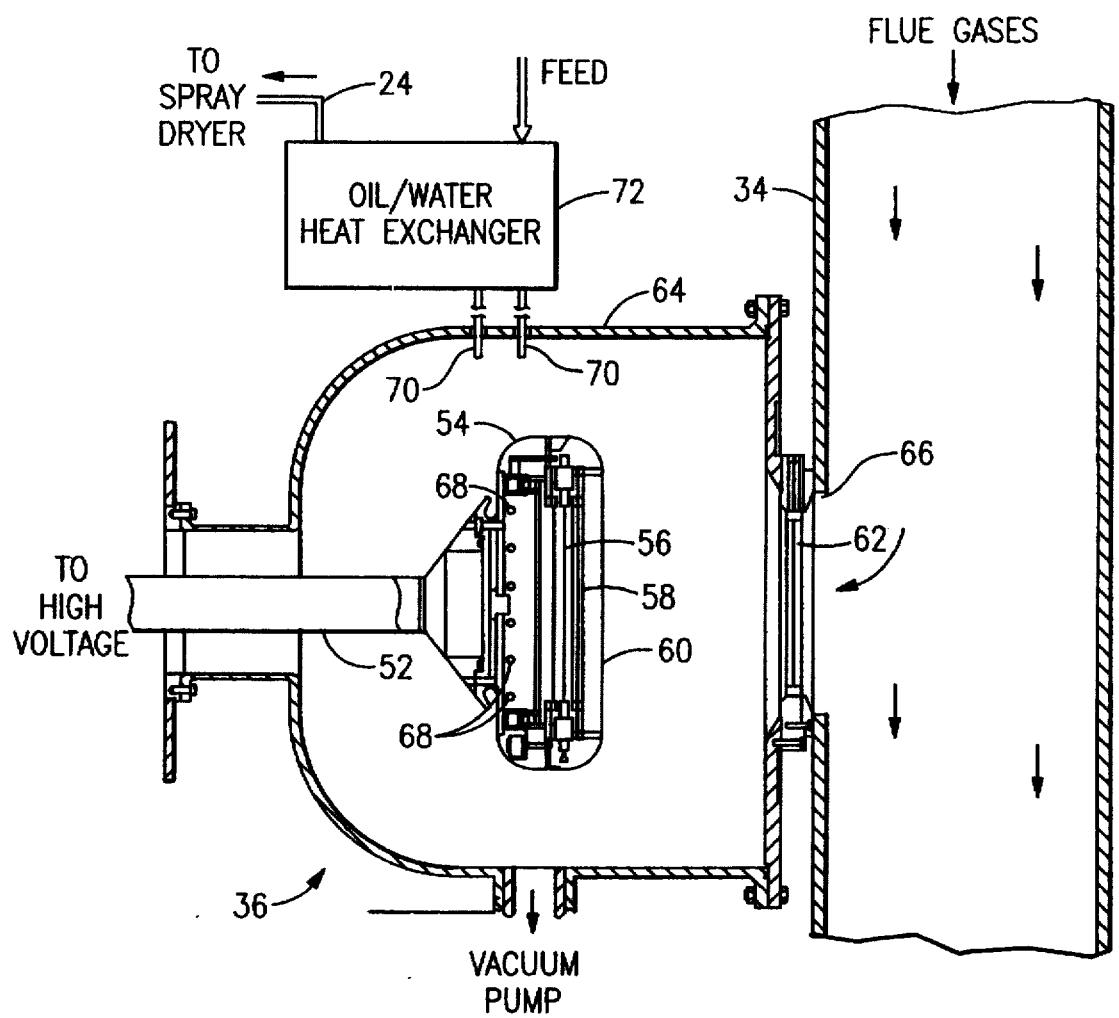
FIG. 2 is a sectional view showing details of a broad beam electron accelerator or gun employed in the embodiment of FIG. 1.

An example of the broad-beam e-beam accelerator 36 is shown in some detail in FIG. 2. The accelerator 36 as used in this embodiment is the subject of U.S. patent application Ser. No. 08/710,817 filed Sep. 23, 1996. The disclosure of that patent application is incorporated herein by reference, by permission of assignee of said application. Here, a cathode support arm or stalk 52 supports a cathode housing 54 at its distal end. The cathode housing includes front and back field shaper elements, not shown here in detail. An array of thermionic cathode rods 56 are supported side by side in the cathode housing 54. Here one cathode rod 56 is shown oriented in the plane of the drawing. In practice these are thoriated tungsten rods and are spaced about two cm apart over the length of the cathode. A first planar grid 58 of 92.2% transparent molybdenum mesh serves as control grid, and a second similar mesh 60 serves as screen and is at a slightly higher potential than the control grid 58. The screen grid 60 shields the high field regions of the gun 36 from hot emitting surfaces, and also capacitively decouples the control grid from an anode 62 that is disposed distally of the cathode housing 54. Here, the anode comprises a metal film that is transparent to high energy electrons, and can preferably include thin supporting anode ribs, so that the foil anode is at least 90% transparent. The foil can be a beryllium copper alloy, with the ribs fabricated out of skived BeCu alloy and electron-beam welded to incorporate internal cooling passages. In another implementation, the anode comprises an 8022 aluminum alloy foil, which can be rolled to a thickness of about 75 μm and can include alternate layers of TiN and ZrN. In this implementation, two hundred paired layers are used, each layer of 100 Å thickness, with a total coating thickness of 3.0 μm±0.3 μm. This coating, which gives the anode foil 62 a hardness index greater than that of tungsten carbide and is impervious to mixtures of concentrated nitric and sulfuric acid, adheres very strongly to this aluminum alloy. This coating prevents direct contact with concentrated nitric and sulfuric acids, which is the principal cause of foil corrosion of electron beam windows in the electron beam dry scrubbing process.

The accelerator 36 preferably has an average current density of 250 μA/cm$^2$, over an anode area of about 25 cm by 100 cm or 50 cm by 100 cm.

Here, a vacuum housing 64 contains the cathode housing 54, and a front or distal wall of the vacuum housing holds the foil anode 62 in a window 66 that opens into the conduit 34. Electrons generated by the cathode rods 56 propagate forward and are accelerated towards and through the anode 62 and into the flue gases passing through the conduit 34 past the window 66. As aforesaid, the accelerator 36 is operated in a pulse mode. The control grid 58 operates to pass only the electrons that are sufficiently energetic to traverse the foil anode 62. This limits the number of electrons that are absorbed in the anode, and thus reduces the amount of thermal energy present in the anode. Also, the use of the grid 58 eliminates one of the prime causes of anode foil fatigue, namely the deposition of low energy electrons on the front surface of the foil. Low energy electrons can induce a large thermal shock in the foil on each pulse, regardless of which foil is employed, and this will eventually lead to anode foil failure. However, by timing the grid 58 to gate only during the high energy (above 250 keV) portion of the accelerating pulse, these low energy electrons are completely eliminated.

The accelerator 36 is liquid cooled, and some of the cooling coils, namely cooling tubes 68 are shown here positioned on the rear portion of the cathode housing 54. Additional cooling passages can be incorporated elsewhere, for example on the supporting ribs of the foil anode. In this embodiment transformer oil is employed for thermal management, and a pair of conduits 70, 70 are here shown penetrating the vacuum housing 64 and leading from the cathode housing 54 to an oil/water heat exchanger 72. Cool water is supplied to a feed line of the heat exchanger, and after absorbing thermal energy from the oil, the water is supplied to the make-up water line 24 for the spray dryer. Also in the vacuum housing, an evacuation port leads to a vacuum pumping system (not shown).

The arrangement as here disclosed has several advantages over the previously proposed electron beam scrubbing treatment techniques. First, the ammonium sulfate-nitrate by-product is produced with a particle size of 100 μm or greater, as compared to the 1 μm particle size that could be produced by the previous techniques. Second, this technique eliminates more of the SO$_2$ content at a relatively low energy cost than could be achieved previously. This scrubbing technique is ideal for use with high sulfur/low energy fuels, such as oil shale or high sulfur coal. Also, the problem of coating with nitrate and sulfate salts, and the attendant need for maintenance are eliminated. Moreover, because the same water used for absorbing excess heat in the accelerator is used for make-up water in the spray dryer, the input energy requirement is reduced and less waste heat is vented to the environment.

While the invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

We claim:

1. Arrangement for scrubbing nitrogen oxides and sulfur oxides from a stream of flue gases, comprising:

precipitator means for removing particulate fly ash from said stream of flue gases leaving a stream of gases including oxides of nitrogen and sulfur;

spray dryer means following said precipitator means including an inlet to receive said stream of gases from said precipitator means, a gas outlet, moisturizing means for injecting into said stream of gases an aqueous solution of nitrate and sulfate salts, and make-up means for injecting make-up water into said stream of gases, for cooling and moisturizing said stream of gases and evaporating water from said aqueous solution to leave particulate dry salts as a by-product;

means for injecting a reagent into the moisturized stream of gases leaving said spray dryer means;

e-beam reactor means supplied with said moisturized stream of gases for irradiating said gases in contact with said reagent to produce sulfate and nitrate salts in said stream;

wet precipitator means following said e-beam reactor means for removing from said stream of gases the nitrate and sulfate salts as an aqueous solution and supplying same through a feedback conduit to the moisturizing means of said spray dryer means; and an exhaust conduit conducting the stream of gases scrubbed of said nitrogen oxides and said sulfur oxides from said wet precipitator means.

2. The scrubbing arrangement according to claim 1, wherein said reagent injecting means includes means to inject ammonia in a near-stoichiometric amount in relation to said oxides of nitrogen and sulfur.

3. The scrubbing arrangement according to claim 1, wherein said e-beam reactor includes water cooling means for management of heat produced in connection with generation of one or more electron beams, and said make-up means includes means for injecting into said spray dryer water that has been pre-heated with waste heat in said water cooling means.

4. The scrubbing arrangement according to claim 1, wherein said e-beam reactor means includes at least one electron gun operated in pulsed mode.

5. The scrubbing arrangement according to claim 4, wherein each said electron gun is a tetrode device having a cathode and two grids.

6. The scrubbing arrangement according to claim 5, wherein each said electron gun is configured for sustained operation at about 1.25 MW.

7. The scrubbing arrangement according to claim 1, further comprising a flue gas conduit for carrying said flue gases through said e-beam reactor means and from said e-beam reactor means to said wet precipitator means, and one or more spray jets installed in said flue gas conduit for washing off any accumulation of said nitrate and sulfate salts from said flue gas conduit.

8. The scrubbing arrangement according to claim 1, wherein said by-product particulate dry salts have a nominal diameter of about 100 µm.

9. A scrubbing process for removing from combustion flue gases in a flue gas stream of combustion by-products including oxides of nitrogen and sulfur by converting said oxides into nitrate and sulfate salts in particulate form, comprising the steps of removing fly ash from said flue gas stream, leaving a stream of gases including said oxides of nitrogen and sulfur;

supplying said stream of gases to a spray dryer, and injecting into said stream of gases in said spray dryer an aqueous solution of nitrate and sulfate salts for cooling and moisturizing said stream of gases and evaporating water from said aqueous solution to leave particulate dry salts as a by-product;

injecting a reagent into the moisturized stream of gases leaving said spray dryer;

irradiating the moisturized steam of gases in contact with said reagent with an electron beam to produce sulfate and nitrate salts in said stream;

separating the nitrate and sulfate salts from said stream of gases as an aqueous solution; and feeding said aqueous solution through a feed line back to said spray dryer.

10. A scrubbing process according to claim 9, wherein said step of injecting a reagent includes injecting ammonia in a near-stoichiometric amount in relation to said oxides of nitrogen and sulfur.

11. A scrubbing process according to claim 9, wherein said irradiating is carried out in an e-beam reactor in which water is employed for management of heat produced in connection with generation of one or more electron beams, and further including the step of supplying as make-up water to the spray dryer water that has been pre-heated with waste heat in said e-beam reactor.

12. A scrubbing process according to claim 9, further comprising spray washing any accumulation of said nitrate and sulfate salts from flue gas conduit leaving said e-beam reactor.

13. A scrubbing process according to claim 9, wherein said step of injecting the aqueous solution into said stream of gases in said spray dryer includes producing said by-product particulate dry salts with a nominal diameter of about 100 µm.

* * * * *

UNITED STATES PATENT AND TRADEMARK OFFICE
CERTIFICATE OF CORRECTION

PATENT NO. : 5,695,616

DATED : December 9, 1997

INVENTOR(S): Helfritch et al.

It is certified that errors appear in the above-identified patent and that said Letters Patent is hereby corrected as shown below:

Column 4, line 3 - Please change "add" to read --acid-- after "nitric" and "sulfuric", respectively.

Signed and Sealed this

Seventeenth Day of March, 1998

*Attest:*

BRUCE LEHMAN

*Attesting Officer*  Commissioner of Patents and Trademarks